2,794,790

Patented June 4, 1957

2,794,790

PREPARATION OF THERMOSETTING BINDERS FROM PHENOL DERIVATIVES OF WASTE SULPHITE LIQUOR

Harry B. Marshall and Alan C. Shaw, Toronto, Ontario, Canada, assignors to Ontario Research Foundation, Toronto, Ontario, Canada No Drawing. Application November 2, 1953,
Serial No. 389,864

5 Claims. (Cl. 260—17.5)

This invention relates to a method for the preparation of a thermosetting binder from phenol derivatives of waste sulphite liquor and a reactive aldehyde, in particular a binder which is suitable for the consolidation of finely divided wood waste, e. g., sawdust and shavings, into useful products such as wallboards, plywood corestock, etc. Present methods for the consolidation of such wood wastes involve the use of expensive synthetic resin adhesives of the phenolformaldehyde, urea-formaladehyde or melamine formaladehyde type. The cost of these resin adhesives represents a large portion of the cost of the finished product. By our process a waste product, lignin, which has been rendered water soluble by the sulphite cooking process, is modified by chemical treatment to permit its use as a binder in place of the synthetic resin adhesives at a considerable cost advantage.

In the co-pending application of Harry Borden Marshall and Mary Krizsan, Serial No. 299,278, filed July 16, 1952, now Patent 2,772,140, a process was disclosed for the condensation of phenols with decationized waste sulphite liquor.

The process is briefly as follows: waste sulphite liquor is passed through a cation exchange column to remove calcium or any other cations present, the decationized liquor heated with a phenol, and the excess phenol removed.

We have now discovered that these phenol derivatives of waste sulphite liquor will react in aqueous solution with a reactive aldehyde such as formaldehyde or furfural to yield water-soluble condensation products with thermosetting properties, i. e., on further heating or drying they are converted to insoluble resins. Thus the water-soluble condensation products of phenol derivatives of waste sulphite liquor with an aldehyde may be applied to shavings or other wood wastes, and then, by the further application of heat and pressure, converted to an insoluble resinous binding material.

While phenol derivatives of waste sulphite liquors prepared according to the process of the co-pending application of Harry Borden Marshall and Mary Krizsan, Serial No. 299,278, filed July 16, 1952, now Patent 2,772,140, are suitable for use in the present process to produce a thermosetting binder, it is to be understood that this invention is not to be limited to the treatment of only those phenol derivatives of waste sulphite liquors described and claimed in the said co-pending application. The process which forms the subject matter of this invention may be effected using any phenol derivative of waste sulphite liquor, however produced. It is, therefore, to be understood that where here and elsewhere in our specification and claims we use the words "phenol derivative of waste sulphite liquor," this phrase is to be construed as including all such phenol derivatives whether produced according to the teaching of the said co-pending application of Harry Borden Marshall and Mary Krizsan, or otherwise.

A process has been described (German Patent 593,505, issued on February 27, 1934) in which waste sulphite liquor, a phenol and an aldehyde are heated together in the presence of an ammonium salt as a catalyst. We have found that under these conditions phenols and aldehydes react very rapidly with one another, but only react very slowly, if at all, with waste sulphite liquor. Thus, the reaction product obtained by this process is undoubtedly a mixture of waste sulphite liquor and phenol aldehyde condensation products.

By contrast an essential feature of our process is the fact that the waste sulphite liquor is condensed with the phenol, in accordance with the co-pending application of Harry Borden Marshall and Mary Krizsan Serial No. 299,278, now Patent 2,772,140, before any aldehyde is added. This ensures the presence of sufficient phenolic groups in the lignin so that on subsequent reaction with an aldehyde, a water-soluble thermosetting compound is formed which on further heating becomes insoluble in water.

We have found that the characteristics of binders prepared by the method of our invention depend on a number of factors, (a) the type and amount of phenol used for condensation with the waste sulphite liquor, (b) the type and amount of aldehyde used for condensation with the phenol derivative of waste sulphite liquor, (c) the degree of pre-curing of the phenol-waste sulphite liquor-aldehyde resin.

(a) In accordance with the co-pending application of Harry Borden Marshall and Mary Krizsan, S. N. 299,278, now Patent 2,772,140, a wide range of phenolic derivatives of waste sulphite liquor may be prepared, and any of these may be treated with a reactive aldehyde to form a water-soluble thermosetting binder. However, we prefer, for economic reasons, to use as a starting material the derivative of waste sulphite liquor and phenol (hydroxy benzene), or waste by-product phenols, for example the crude phenolic mixture recovered from the caustic scrubbers of a petroleum refinery.

We have found that the product prepared from a derivative of waste sulphite liquor containing less than 5 parts of combined phenol per 100 parts of sulphite liquor solids lacks water resistance, but may be used in applications where water resistance is not required. Phenol derivatives of waste sulphite liquor containing more than 45 parts of phenol per 100 parts of sulphite liquor solids contain excessive amounts of water-insoluble condensation products. This heterogeneous mixture may be treated with a reactive aldehyde to form a thermosetting binding material which is only partially water-soluble. Alternatively, the insoluble material may be separated and dissolved in a suitable solvent such as alcohol, or it may be rendered water-soluble by sulphonation, and then treated with a reactive aldehyde to form a soluble thermosetting binding material. Such procedures are within the scope of this invention. However, we prefer to treat a phenol derivative of waste sulphite liquor containing between 5 and 45 parts of combined phenol per 100 parts of sulphite liquor solids with a reactive aldehyde to form a water-soluble product which may be condensed by the action of heat to an insoluble, water-resistant binding material.

In the co-pending application of Harry Borden Marshall and Mary Krizsan, Serial No. 299,278, now Patent 2,772,140, it was shown that the reaction of waste sulphite liquor with phenol does not go to completion, and that for many purposes it is necessary to extract the excess phenol from the reaction mixture. We have found that the unextracted reaction mixture may be heated with a reactive aldehyde to form a product from which no lignin-free condensation product can be separated by a physical process, such as fractional precipitation or extraction. We conclude therefore that this process results in the formation of a true copolymer of the phenol and the phenol derivative of sulphite liquor with the reactive aldehyde, and this process is included in our invention.

(b) Any aldehyde which may be condensed readily with phenol may be used in our process, but for economic reasons we prefer to use formaldehyde or furfural. The optimum quantity of aldehyde is dependent on the type and amount of phenol used in the preparation of the phenol derivative of waste sulphite liquor. In general, the binding strength of the resin increases with increasing amounts of aldehyde. However, a maximum strength is eventually reached which, in some cases corresponds to as much as 5 moles of aldehyde per mole of phenol (free and combined) present. The amount of aldehyde added may vary from ⅛ mole to 5 moles per mole of phenol (free and combined) in the phenol derivative of waste sulphite liquor, depending upon cost factors, and the properties desired in the final product.

(c) The mixture of phenol derivative of waste sulphite liquor and aldehyde may be heated for a period of time prior to application to the waste wood material. During this time partial reaction of the aldehyde with the phenol derivative of waste sulphite liquor occurs, with the result that less aldehyde is lost by evaporation during subsequent handling, and less time is required to complete the reaction in the press. While this period of heating is not essential to the successful application of our invention, we prefer to heat the mixture of reactants at 100° C. for 1 hour after the addition of the aldehyde and prior to its application to the waste wood material.

For the application of our invention in the manufacture of dry process synthetic boards, the liquid binder may be applied to the waste wood material by any suitable mixing technique in amounts of 2–20% of the wood fibre, on a dry solids basis. The strength of the pressed board is dependent to a considerable extent on the moisture content of the mixture of binder and waste wood fibres prior to pressing. The optimum moisture content is dependent both on the type of binder used and on the character of the wood waste. It must be determined by experiment for each formulation but in general lies between 10 and 30%.

The mixture of binder and wood waste is formed into a mat and is then pressed between heated plattens until the binder has been converted to the insoluble state. The optimum temperature varies between 100 and 140° C., depending upon the formulation used, and must also be established by experiment. The time required to insolubilize the binder varies with the thickness of the board, 10 minutes being required for a board 0.2 inch thick and 30 minutes being required for a board 0.5 inch thick. Pressure is without important effect on the cure of the binder and may be varied according to the density and strength required in the resulting board.

The following description of experiments which have been performed by us will serve to illustrate the application of our invention. It is to be understood that our invention is not limited to the materials and conditions described in these experiments which are to be considered as examples only.

*Example 1.—Illustrating the preparation of a thermosetting binding material from formaldehyde and a phenol derivative of waste sulphite liquor*

100 millilitres of an aqueous solution of a phenol derivative of waste sulphite liquor (containing 24.8 grams of dry solids of which 9.3 grams was combined phenol) was heated at 100° C. for one hour with 9.0 grams of 36% formaldehyde solution. 39 grams of this solution was applied to 100 grams of shredded wood shavings (6–10 mesh). The mixture was adjusted to 25% moisture content and pressed under 500 p. s. i. pressure for 10 minutes between 8 inch square plattens heated to 110° C. The resulting synthetic board, which had a thickness of 0.129 inch, was tested according to the American Society for Testing Materials specification No. D–1037, and was found to have a tensile strength of 1,255 p. s. i.

*Example 2.—Illustrating the preparation of a thermosetting binding material from furfural and a phenol derivative of waste sulphite liquor*

A mixture of 28.5 grams of furfural and 100 millilitres of an aqueous solution of a phenol derivative of waste sulphite liquor (containing 24.8 grams of dry solids of which 9.3 grams was combined phenol) was heated at 100° C. for one hour. 26 grams of this solution was thoroughly mixed with 100 grams of wood shavings. The mixture was adjusted to a moisture content of 10% and pressed at 500 p. s. i. pressure for 10 minutes between 8 inch square plattens at 120° C. The product had a thickness of 0.132 inch and a tensile strength of 1,890 p. s. i.

*Example 3.—Illustrating the preparation of a thermosetting binding material from formaldehyde and a cresol derivative of waste sulphite liquor*

The mixed cresols used in this experiment were recovered from the alkaline scrubbers of a petroleum refinery. 100 millilitres of a solution of this cresol derivative of waste sulphite liquor (containing 25.0 grams of dry solids of which 7.0 grams was combined cresols) was heated at 100° C. for one hour with 5.8 grams of 36% formaldehyde solution. 39 grams of this solution was mixed with 100 grams of 6 to 10 mesh shredded wood shavings, the moisture content was adjusted to 15%, and the mixture was pressed at 500 p. s. i. for 10 minutes between 8 inch square plattens at 130° C. The resulting product had a thickness of 0.138 inch and a tensile strength of 1,582 p. s. i.

*Example 4.—Illustrating the preparation of a thermosetting binding material from furfural and a cresol derivative of waste sulphite liquor*

100 millilitres of a solution of a cresol derivative of waste sulphite liquor (containing 25 grams of dry solids of which 7.0 grams was combined cresols) was heated at 100° C. for one hour with 18.6 grams of furfural. 27 grams of this solution was mixed with 100 grams of 6 to 10 mesh shredded wood shavings. The mixture was adjusted to a moisture content of 15% and pressed at 130° C. and 500 p. s. i. pressure for 10 minutes between 8 inch square plattens. The resulting product had a thickness of 0.133 inch and a tensile strength of 2,260 p. s. i.

*Example 5.—Illustrating the preparation of a thermosetting binding material from formaldehyde and a phenol derivative of waste sulphite liquor containing free phenol*

100 millilitres of an aqueous solution of a phenol derivative of waste sulphite liquor (containing 31.0 grams of dry solids of which 8.5 grams was combined phenol and 8.5 grams was free phenol) was heated at 100° C. for 10 minutes with 68 grams of 36% formaldehyde solution. 30 grams of this solution was applied to 100 grams of 6 to 10 mesh shredded wood shavings and pressed at 110° C. for 10 minutes between 8 inch square plattens. The product had a thickness of 0.142 inch and a tensile strength of 1,560 p. s. i.

*Example 6.—Illustrating the preparation of a thermosetting binding material from formaldehyde and a phenol derivative of waste sulphite liquor of low phenol content*

100 millilitres of a solution of a phenol derivative of waste sulphite liquor (containing 26.1 grams of dry solids of which only 1.9 grams was combined phenol) was heated at 100° C. for one hour with 7.8 grams of 36% formaldehyde solution. 38 grams of this solution was mixed with 100 grams of 6 to 10 mesh shredded wood shavings and pressed at 120° C. for 10 minutes. The product had a tensile strength of 1,120 p. s. i. and a thickness of 0.142 inch.

*Example 7.—Illustrating the effect of cresol content on the strength of binders prepared from formaldehyde and cresol derivatives of waste sulphite liquor*

A series of cresol derivatives of waste sulphite liquor were prepared with varying contents of combined cresol, as shown in Table I. Each cresol derivative was then converted to a thermosetting binder by heating 19 grams of an aqueous solution containing 7 grams dry solids with 7 grams of 36% formaldehyde solution for 1 hour at 100° C. Synthetic boards were then made from each of the resulting solutions by applying 3.7 grams of the solution to 10.0 grams of shredded wood shavings and pressing the mixture for 10 minutes at 130° C. Six specimens of each board were prepared, three of which were immersed in water for 1 hour after pressing. All samples were conditioned at 50% relative humidity and 70° F. prior to determination of flexural strength. The results of flexural tests shown in Table I, are given in arbitrary units and are only suitable for comparative purposes. They indicate that the binders have high water resistance and that strength increases slightly with increasing cresol content.

TABLE I

| Cresol Content (percent of dry solids) | Strength (lbs.) | |
|---|---|---|
| | Dry | After Immersion |
| 14.2 | 69 | 63 |
| 21.6 | 67 | 65 |
| 27.5 | 82 | 82 |

*Example 8.—Illustrating the effect of formaldehyde content on the strength of binders prepared from formaldehyde and phenol derivatives of waste sulphite liquor*

A series of binders was prepared from a phenol derivative of waste sulphite liquor containing 37.4% combined phenol. 100 ml. portions of a 24.8% solution of this material were heated with various amounts of 36% formaldehyde solution, as shown in Table II, for 1 hour at 100° C. Synthetic boards were then made from each of the resulting solutions by applying 4.0 grams of the solution to 10 grams of shredded wood shavings and pressing the mixture at 100° C. for 10 minutes. Two specimens of each board were prepared, one of which was immersed in water for 1 hour after passing. All samples were conditioned at 50% relative humidity and 70° F. prior to determination of flexural strength. The results, given in arbitrary units in Table II, show that flexural strength increases with increasing formaldehyde ratio.

TABLE II

| Formaldehyde Content (grams 36% formaldehyde solution/100 ml. solution) | Strength (lbs.) | |
|---|---|---|
| | Dry | After Immersion |
| 1.48 | 103 | 75 |
| 2.95 | 125 | 81 |
| 5.90 | 144 | 90 |

What we claim as our invention is:

1. A process for the preparation of a thermosetting binder from waste sulphite liquor which comprises reacting a waste sulphite liquor phenol reaction product having a phenol content of between 5 percent and 45 percent by weight, such waste sulphite liquor phenol reaction product being obtained by the condensation of a phenol with decationized waste sulphite liquor, said phenol being selected from the group consisting of monohydric, dihydric and trihydric phenols and combinations thereof, with an aldehyde containing fewer than 6 carbon atoms, said aldehyde being present in the ratio of from ⅛ mole to 5 moles per mole of phenol.

2. The process of claim 1 wherein said aldehyde is formaldehyde.

3. The process of claim 1 wherein said aldehyde is furfural.

4. The process of claim 1 wherein said aldehyde is acetaldehyde.

5. A process for the preparation of a thermosetting binder from waste sulphite liquor which comprises reacting a waste sulphite liquor phenol reaction product having a phenol content of between 5 percent and 45 percent by weight, such waste sulphite liquor phenol reaction product being obtained by the condensation of a phenol with decationized waste sulphite liquor, said phenol being selected from the group consisting of monohydric, dihydric and trihydric phenols and combinations thereof and containing excess unreacted phenol, with an aldehyde containing fewer than 6 carbon atoms, said aldehyde being present in the ratio of from ⅛-mole to 5 moles per mole of phenol.

References Cited in the file of this patent

UNITED STATES PATENTS

| 2,045,049 | Noerr et al. | June 23, 1936 |
| 2,099,717 | Alles | Nov. 23, 1937 |
| 2,221,778 | Collings et al. | Nov. 19, 1940 |

FOREIGN PATENTS

| 519,848 | Great Britain | Apr. 8, 1940 |